(12) United States Patent
Yazawa et al.

(10) Patent No.: US 6,449,122 B1
(45) Date of Patent: Sep. 10, 2002

(54) THIN-FILM MAGNETIC HEAD INCLUDING SOFT MAGNETIC FILM EXHIBITING HIGH SATURATION MAGNETIC FLUX DENSITY AND LOW COERCIVE FORCE

(75) Inventors: Hisayuki Yazawa; Yoshihiro Kanada; Hiroaki Nakajima, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/599,349

(22) Filed: Jun. 20, 2000

(30) Foreign Application Priority Data

Jun. 21, 1999 (JP) ............................................. 11-173895

(51) Int. Cl.[7] .............................................. G11B 5/147
(52) U.S. Cl. ..................................................... 360/126
(58) Field of Search ....................... 360/126, 317–318.1

(56) References Cited

U.S. PATENT DOCUMENTS

| 5,606,478 A | 2/1997 | Chen et al. |
| 5,812,350 A | 9/1998 | Chen et al. |
| 5,864,450 A | 1/1999 | Chen et al. |
| 6,262,867 B1 * | 7/2001 | Sano ........................... 360/126 |

\* cited by examiner

*Primary Examiner*—A. J. Heinz
(74) *Attorney, Agent, or Firm*—Brinks Hofer Gilson & Lione

(57) ABSTRACT

A NiFe alloy film is formed by an electroplating process using a pulsed direct current. The resulting NiFe alloy has an average crystal grain size of not more 105 Å and an Fe content in a range of 60 percent by weight to 75 percent by weight. The NiFe alloy film exhibits a high saturation magnetic flux density and a low coercive force. A thin-film magnetic head having a lower core layer and/or an upper core layer composed of the NiFe alloy film is suitable for higher recording densities.

10 Claims, 3 Drawing Sheets

AVERAGE CRYSTAL GRAIN SIZE [Å]

CENTER-LINE-AVERAGE ROUGHNESS Ra [Å]

THIN-FILM MAGNETIC HEAD INCLUDING SOFT MAGNETIC FILM EXHIBITING HIGH SATURATION MAGNETIC FLUX DENSITY AND LOW COERCIVE FORCE

BACKGROUND OF THE INVENTION

1. Field of the Invention

The present invention relates to a thin-film magnetic head having a soft magnetic film as a core layer. In particular, the present invention relates to a thin-film magnetic head using a soft magnetic film having a high saturation magnetic flux density $M_s$ and a low coercive force $H_c$.

2. Description of the Related Art

A magnetic head mounted in, for example, a hard disk has a thin-film magnetic head provided at the tip of a gimbal. This thin-film magnetic head includes an inductive write head and a MR read head.

The inductive head typically includes a lower core layer composed of a magnetic material, a nonmagnetic gap layer formed on the lower core layer, an upper core layer formed on the gap layer, and a coil layer for inducing a recording magnetic field in these core layers.

Conventional upper and lower core layers are composed of, for example, NiFe alloys (permalloy). The NiFe alloy layers are formed by electroplating. According to a conventional process, the alloy has an Fe content of approximately 45 to 55 percent by weight and exhibits a maximum saturation magnetic flux density $M_s$ of approximately 1.5 T (tesla). However, soft magnetic films must have a higher saturation magnetic flux density, $M_s$, to increase recording densities.

One method for increasing the saturation magnetic flux density $M_s$, is to increase the Fe content. According to a conventional electroplating process using a continuous direct current, the saturation magnetic flux density $M_s$ can be increased to approximately 1.8 T when the Fe content is increased to approximately 67 percent by weight. The saturation magnetic flux density $M_s$, however, cannot be increased further using this process even if the Fe content is increased further.

Moreover, the electroplating process using a continuous direct current increases the crystal grain size significantly when the Fe content exceeds approximately 62 percent by weight. These large crystal grains cause surface roughening of the film. As a result, the coercive force $H_c$ is significantly increased.

Accordingly, it is difficult for the electroplating process using a continuous direct current to obtain a high saturation magnetic flux density $M_s$ suitable for increasing recording densities even if the Fe content is increased in the NiFe alloy. Moreover, the coercive force $H_c$ is undesirably increased. Both a high saturation magnetic flux density $M_s$ and a low coercive force $H_c$ are required for increasing recording densities.

SUMMARY OF THE INVENTION

It is an object of the present invention to provide a thin-film magnetic head suitable for high recording densities and high recording frequencies having a core layer formed of a soft magnetic film composed of a NiFe alloy exhibiting a high saturation magnetic flux density $M_s$ and a low coercive force $H_c$.

A thin-film magnetic head in accordance with the present invention includes a lower core layer comprising a magnetic material, an upper core layer, a magnetic gap provided between the lower core layer and the upper core layer, the lower core layer and the upper core layer opposing each other separated by the magnetic gap at a face opposing a magnetic medium, and a coil layer inducing a recording magnetic field in the lower core layer and the upper core layer. At least one of the lower core layer and the upper core layer comprises a soft magnetic film comprising a NiFe alloy having the formula $Ni_{1-x}Fe_x$, an average crystal grain size of not more than 105 Å, and an Fe content x in a range of 60 to 75 percent by weight.

Preferably, the average crystal grain size is not more than 100 Å.

Preferably, the Fe content is at least 67 percent by weight.

The soft magnetic film has a center-line-average roughness ($R_a$) of preferably not more than 25 Å and more preferably not more than 15 Å.

The soft magnetic film has a saturation magnetic flux density $M_s$ of preferably at least 1.6 T, and more preferably at least 1.8 T. In the present invention, a maximum saturation magnetic flux density $M_s$ of approximately 1.9 T is obtainable.

The soft magnetic film has a coercive force $H_c$ of preferably not more than 1.5 Oe and more preferably not more than 1.0 Oe.

Preferably, the soft magnetic film is formed by an electroplating process using a pulsed direct current.

In the NiFe alloy film of the present invention, the average crystal grain size and the Fe content in the alloy film are optimized in order to achieve a maximum saturation magnetic flux density $M_s$ of approximately 1.9 T, which is higher than that of a conventional NiFe alloy film. Moreover, the NiFe alloy film of the present invention exhibits a low coercive force $H_c$ due to the optimized center-line-average roughness ($R_a$), the optimized average crystal grain size, and the optimized Fe content. As a result, the NiFe alloy exhibits a saturation magnetic flux density $M_s$ of at least 1.6 T and preferably at least 1.8 T and a coercive force $H_c$ of not more than 1.5 Oe and preferably not more than 1.0 Oe, even when the Fe content in the alloy is increased to a range of 60 percent by weight to 75 percent by weight. This NiFe alloy film is formed by the electroplating process using a pulsed direct current.

In a NiFe alloy formed by the electroplating process using the pulsed direct current, the average crystal grain size and the center-line-average roughness ($R_a$) of the film surface can be reduced so that both a high saturation magnetic flux density $M_s$ and a low coercive force $H_c$ are simultaneously achieved. The NiFe alloy film in the present invention exhibits a specific resistance which is comparable to that of a NiFe alloy film formed by a conventional electroplating process using a continuous direct current.

The thin-film magnetic having a lower core layer and/or an upper core layer composed of such a soft magnetic film is suitable for future higher recording densities and higher recording frequencies.

DESCRIPTION OF THE PREFERRED EMBODIMENT

Figure 1:
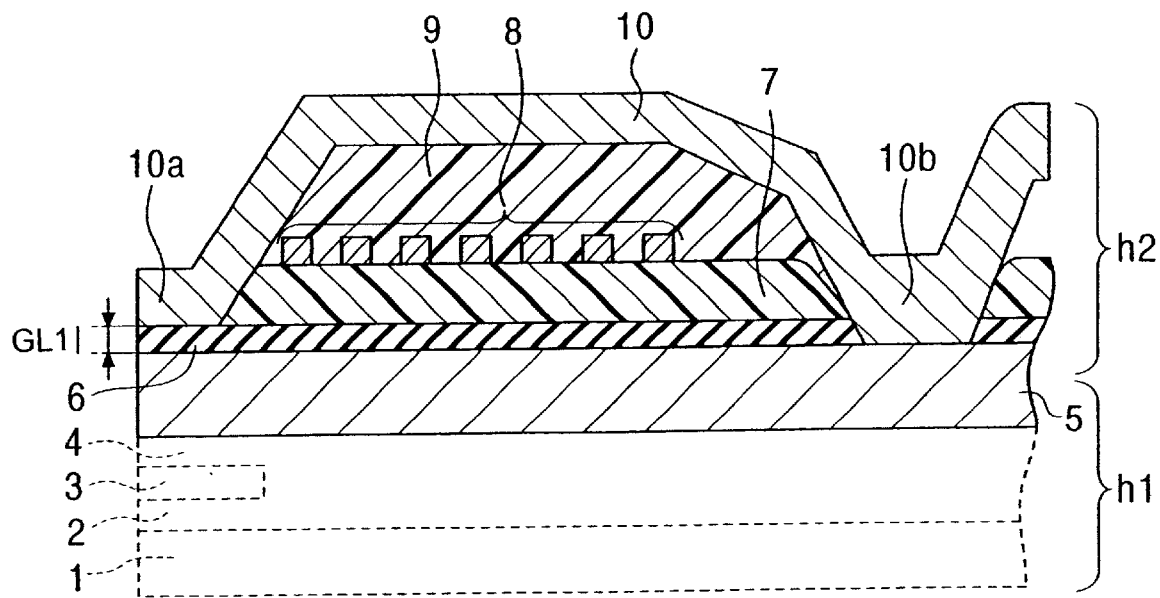
FIG. 1 is a longitudinal cross-sectional view of a thin-film magnetic head in accordance with an embodiment of the present invention.

FIG. 1 is a longitudinal cross-sectional view of a thin-film magnetic head in accordance with an embodiment of the present invention. In FIG. 1, the left end face of the thin-film magnetic head is a face opposing a recording medium. This thin-film magnetic head is provided at a trailing end of a slider which is a component of a floating head, and is a combined MR/inductive thin-film magnetic head (hereinafter referred to as a thin-film magnetic head) including a MR read head h1 and an inductive write head h2.

The MR head h1 detects fringing magnetic fields on a recording medium such as hard disk by a magnetoresistive effect and converts the fringing magnetic fields into recorded signals. The MR head has a lower shielding layer 1 formed of a soft magnetic material. The lower shielding layer 1 is arranged at a trailing side face of the slider.

With reference to FIG. 1, a lower gap layer 2 formed of a nonmagnetic material such as $Al_2O_3$ (alumina) is formed on the lower shielding layer 1, and a magnetoresistive layer 3 is formed on the lower gap layer 2. The magnetoresistive layer 3 may have an AMR structure or a GMR structure, such as a spin-valve film having a magnetoresistive effect.

An upper gap layer 4 composed of a nonmagnetic material and a lower core layer 5 are formed on the magnetoresistive layer 3. The lower core layer 5 functions as both a shield in the MR head h1 and a core in the inductive head h2.

As shown in FIG. 1, a gap layer 6 composed of a nonmagnetic material, such as alumina, is formed on the lower core layer 5. An insulating layer 7 composed of polyimide or a resist material is formed on the gap layer 6, and a planar coil layer 8 having a spiral pattern is formed on the gap layer 6. The coil layer 8 is formed of a nonmagnetic conductive material having low electrical resistance, such as copper.

The coil layer 8 is covered with an insulating layer 9 composed of polyimide or a resist material. An upper core layer 10 composed of a soft magnetic material is formed on the insulating layer 9.

As shown in FIG. 1, a leading edge 10a of the upper core layer 10 faces the lower core layer 5 with the gap layer 6 therebetween at the face opposing the recording medium so as to form a magnetic gap having a magnetic gap length Gl1, whereas a base portion 10b of the upper core layer 10 is magnetically coupled with the lower core layer 5.

In order to improve the write performance of the inductive head h2 so that the inductive head h2 is suitable for future increasing recording densities and increasing recording frequencies of the soft magnetic characteristics of the upper core layer 10, the saturation magnetic flux density $M_s$ must be improved while maintaining a low coercive force $H_c$. Moreover, eddy current loss increases with an increased recording frequency. Thus, the specific resistance $\rho$ must be increased to some extent to suppress the eddy current loss.

It is preferable that the lower core layer 5 be also formed of a soft magnetic film having soft magnetic characteristics, such as a high specific resistance $\rho$ and a low coercive force $H_c$. Although a high saturation magnetic flux density $M_s$ is preferred also in the lower core layer 5, the saturation magnetic flux density $M_s$ of the lower core layer 5 is set to be lower than the saturation magnetic flux density $M_s$ of the upper core layer 10 to facilitate inversion of fringing magnetic fields between the lower core layer 5 and the upper core layer 10 and to increase the writing density on the recording medium.

The soft magnetic film used in the lower core layer 5 and/or the upper core layer 10 has a composition represented by the formula $Ni_{1-x}Fe_x$. Moreover, the composition has an average crystal grain size of not more than 105 Å. The average crystal grain size is determined by a half width of an X-ray diffraction peak. More preferably, the average crystal grain size is not more than 100 Å.

The composition preferably has an Fe content in a range of 60 to 75 percent by weight. This Fe content is higher than the Fe content (approximately 55 percent by weight) in a conventional NiFe alloy. Preferably, the Fe content is at least 67 percent by weight.

With an average crystal grain size of not more than 105 Å and an Fe content in a range of 60 to 75 percent by weight, the saturation magnetic flux density $M_s$ can be increased to a desired level while the coercive force $H_c$ is decreased to a desired level.

In the present invention, the center-line-average roughness ($R_a$) of the film surface is preferably not more than 25 Å. According to experimental results, the coercive force $H_c$ depends on not only the average crystal grain size and the Fe content but also on the center-line-average roughness ($R_a$). The coercive force $H_c$ increases as the center-line-average roughness ($R_a$) increases.

Thus, the center-line-average roughness ($R_a$) of the NiFe alloy film is controlled to be not more than 25 Å. In addition, the average crystal grain size and the Fe content are controlled to ensure a decreased coercive force $H_c$. More preferably, the center-line-average roughness ($R_a$) is not more than 15 Å in order to further decrease the coercive force $H_c$.

The NiFe alloy film satisfying the above conditions exhibits a saturation magnetic flux density $M_s$ of at least 1.6 T (tesla), and at least 1.8 T in a more preferable combination of the conditions. In the most preferred combination of the conditions, the maximum saturation magnetic flux density $M_s$ reaches approximately 1.9 T.

Moreover, the NiFe alloy film exhibits a coercive force $H_c$ of not more than 1.5 Oe, and not more than 1.0 Oe in a more preferable combination of the conditions.

The NiFe alloy film is formed by an electroplating process using a pulsed direct current. The NiFe alloy film formed by this process has a specific resistance $\rho$ in a range of 30 $\mu\Omega\cdot cm$ to 45 $\mu\Omega\cdot cm$. This specific resistance $\rho$ is substantially the same level as that of a NiFe alloy film formed by an electroplating process using a conventional continuous direct current and is higher than the specific resistance $\rho$ of a soft magnetic film of a NiFeCo alloy.

The lower core layer 5 and/or the upper core layer 10 of the thin-film magnetic head are composed of the NiFe alloy film having a high saturation magnetic flux density $M_s$ and a low coercive force $H_c$, and are suitable for future increasing recording densities and increasing recording frequencies. Since the specific resistance ρ is at a relatively high level in the present invention, eddy current loss caused by increased recording frequencies can be effectively suppressed.

In the soft magnetic film of the present invention, the center-line-average roughness ($R_a$) of the film surface is small and thus the surface is smooth. Thus, the upper core layer 10 and/or the lower core layer 5 formed of the soft magnetic films can be formed into desired shapes in the vicinity of the face opposing the recording medium (the left face in FIG. 1) defining the track width, resulting in satisfactory recording characteristics.

In the present invention, the NiFe alloy film is formed by an electroplating process using a pulsed direct current. According to this method, the saturation magnetic flux density $M_s$ can be increased as the Fe content in the NiFe alloy increases. In addition, the average crystal grain size and the center-line-average roughness ($R_a$) of the surface can be maintained at small levels.

In a conventional electroplating process using a continuous direct current, the saturation magnetic flux density $M_s$ cannot be further increased when the Fe content in the NiFe alloy film reaches a certain value. On the contrary, the increased Fe content causes coarsening of the crystal grains and a rough surface of the NiFe alloy film. As a result, the coercive force $H_c$ is undesirably increased.

The Fe content in the NiFe alloy is controlled by the concentration of Fe ions in a plating bath. When the content of the Fe ions in the plating bath is high, the Fe content in the NiFe alloy film is also high.

When the NiFe alloy film, however, is formed by a continuous direct current using a plating bath containing an increased Fe ion content, the current density distribution becomes uneven on the NiFe alloy film and the current is continuously concentrated in specific points of the NiFe alloy film. Such irregularity in the current distribution accelerates coarsening of crystal grains. As a result, microvoids readily form in the plated film.

In the present invention, the electroplating process using a pulsed direct current is employed instead of the electroplating process using a continuous direct current. In the electroplating process using a pulsed direct current, ON/OFF operations of a current controlling device are repeated so that a current intermittently flows during the electroplating process. With such an intermittent current flow, the NiFe alloy film is gradually formed. An uneven current density distribution is suppressed even when the Fe ion content in the plating bath is increased. As a result, coarsening of the crystal grains is prevented and the NiFe alloy film has a smooth surface without voids.

Conditions of the pulsed current, however, must be optimized in order to facilitate the formation of fine crystal grains and to suppress roughening of the surface of the NiFe alloy film. For example, in a preferred embodiment, the ON/OFF cycle of the pulsed current is several seconds, and the duty ratio is in a range of approximately 0.1 to 0.5. Under these conditions, the average crystal grain size in the NiFe alloy can be reduced to not more than 105 Å and the center-line-average roughness ($R_a$) on the NiFe alloy film can be reduced to not more than 25 Å, even when the Fe content is increased to a range of 60 percent by weight to 75 percent by weight.

A NiFe alloy film according to the present invention (EXAMPLE) was prepared by an electroplating process using a predetermined pulsed direct current, and a NiFe alloy film for comparison (COMPARATIVE EXAMPLE) was prepared by an electroplating process using a predetermined continuous direct current. The relationships between the Fe content and the saturation magnetic flux density $M_s$ and between the Fe content and the coercive force $H_c$ of each NiFe alloy film were measured.

Figure 2:
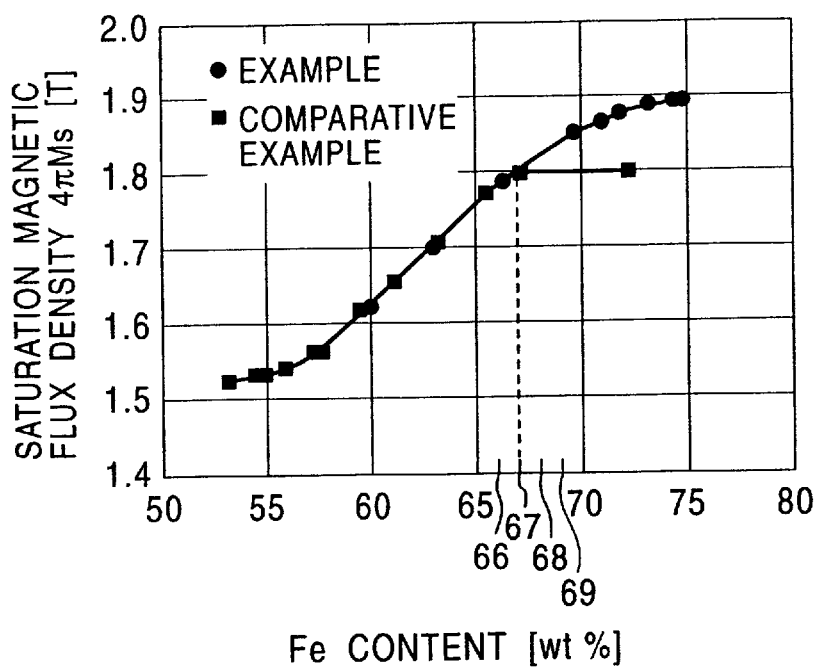
FIG. 2 is a graph showing the relationship between the saturation magnetic flux density $M_s$ and the Fe content in a NiFe alloy film produced by an electroplating process using a pulsed direct current and a NiFe alloy film produced by an electroplating process using a continuous direct current.

FIG. 2 is a graph showing the relationship between the saturation magnetic flux density $M_s$ and the Fe content in the EXAMPLE (the NiFe alloy film produced by the electroplating process using the pulsed direct current) and the COMPARATIVE EXAMPLE (the NiFe alloy film produced by the electroplating process using the continuous direct current) the COMPARATIVE EXAMPLE. In as the Fe content increases to approximately 67 percent by weight, the saturation magnetic flux density $M_s$ also increases to approximately 1.8 T. However, the saturation magnetic flux density $M_s$ does not increase any further when the Fe content exceeds 67 percent by weight.

In the EXAMPLE, as the Fe content increases to approximately 67 percent by weight, the saturation magnetic flux density $M_s$ increases as in case of the COMPARATIVE EXAMPLE. Moreover, the saturation magnetic flux density $M_s$ of the NiFe alloy film continuous increasing when the Fe content exceeds 67 percent by weight. $M_s$ reaches approximately 1.9 T when the Fe content is approximately 75 percent by weight. Thus, in the electroplating process using the pulsed direct current, the saturation magnetic flux density $M_s$ of the NiFe alloy increases at an Fe content exceeding 67 percent by weight.

Figure 3:
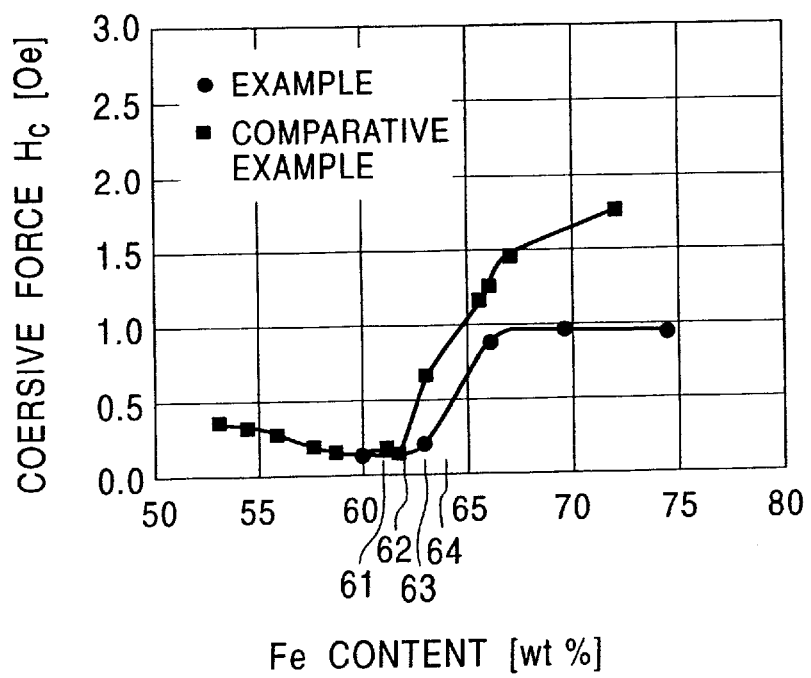
FIG. 3 is a graph showing the relationship between the coercive force $H_c$ and the Fe content in a NiFe alloy film produced by an electroplating process using a pulsed direct current and a NiFe alloy film produced by an electroplating process using a continuous direct current.

FIG. 3 is a graph showing the relationship between the coercive force $H_c$ and the Fe content in the EXAMPLE (the NiFe alloy film produced by the electroplating process using the pulsed direct current) and the COMPARATIVE EXAMPLE (the NiFe alloy film produced by the electroplating process using the continuous direct current).

In the COMPARATIVE EXAMPLE the coercive force $H_c$ can be maintained at a low level of not more than 0.5 Oe when the Fe content in the NiFe alloy is not more than 62 percent by weight. The coercive force $H_c$, however, significantly increases when the Fe content exceeds 62 percent by weight. $H_c$ and exceeds 1.0 Oe at an Fe content of approximately 65 percent by weight and exceeds 1.5 Oe at an Fe content exceeding approximately 67 percent by weight.

In contrast, in the EXAMPLE, the coercive force $H_c$ is maintained at a level lower than 1.0 Oe even when the Fe content reaches approximately 75 percent by weight. Although the coercive force $H_c$ increases when the Fe content exceeds 63 percent by weight, it does not exceed 1.0 Oe up to an Fe content of approximately 75 percent by weight. It is considered that the crystal grain size in the EXAMPLE (the NiFe alloy formed by the electroplating process using the pulsed direct current) is smaller than that in the COMPARATIVE EXAMPLE (the NiFe alloy formed by the electroplating process using the continuous direct current).

In the electroplating process using the pulsed direct current, the dead time between pulses can moderate an uneven distribution of the current density on the NiFe alloy film when the Fe ion content is increased. As a result, coarsening of the crystal grains is suppressed and voids are barely formed in the plated film.

In the electroplating process using the continuous direct current, the current density distribution on the NiFe alloy film is uneven at a high Fe ion content. Thus, the current is concentrated in specific points on the surface of the NiFe alloy film. In these points, coarsening of the crystal grains is accelerated and voids are readily formed.

As shown in FIG. 2, the saturation magnetic flux density $M_s$ increases to a relatively high level in the COMPARATIVE EXAMPLE (the electroplating process using the continuous direct current) as the Fe content increases. As shown in FIG. 3, the coercive force $H_c$ also significantly increases as the Fe content increases due to the coarsening of the crystal grains. Accordingly, the coercive force $H_c$ cannot be maintained at a low level in the COMPARATIVE EXAMPLE (the electroplating process using the continuous direct current) while the saturation magnetic flux density $M_s$ is increased.

With reference to FIGS. 2 and 3, it is preferable that the Fe content in the EXAMPLE (the NiFe alloy film formed by the electroplating process using the pulsed direct current) be in a range of 60 percent by weight to 75 percent by weight. The saturation magnetic flux density $M_s$ can be increased to 1.6 T or more preferably to 1.8 T in this range. Moreover, the coercive force $H_c$ can be suppressed to not more than 1.0 Oe.

As described above, the coercive force $H_c$ significantly depends on the crystal grain size, in addition to the Fe content. The relationship between the average crystal grain size and the coercive force $H_c$ was measured using NiFe alloy films having an Fe content of 72 percent by weight which were formed by an electroplating process in which conditions of the pulsed current were varied. The crystal grain size was determined by the half width of an X-ray diffraction peak.

Figure 4:
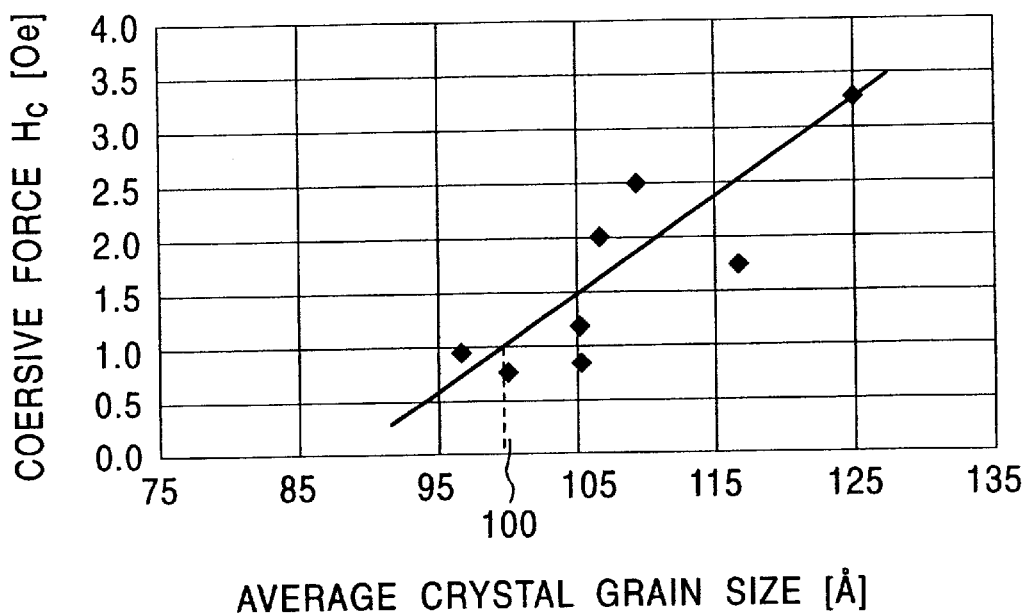
FIG. 4 is a graph showing the relationship between the coercive force $H_c$ and the average crystal grain size in a NiFe alloy film produced by an electroplating process using a pulsed direct current.

As shown in FIG. 4, the coercive force $H_c$ increases as the average crystal grain size increases. With reference to FIG. 4, the average crystal grain size was set to not more than 105 Å in order to maintain a coercive force $H_c$ of not more than 1.5 Oe, and more preferably not more than 100 Å in order to maintain a coercive force $H_c$ of not more than 1.0 Oe.

The coercive force $H_c$ also depends on the center-line-average roughness ($R_a$) of the film surface, in addition to the average crystal grain size. Thus, the center-line-average roughness ($R_a$) is also optimized in order to securely decrease the coercive force $H_c$. The relationship between the center-line-average roughness ($R_a$) and the coercive force $H_c$ was measured using NiFe alloy films having an Fe content of 72 percent by weight which were formed by an electroplating process in which conditions of the pulsed current were varied.

Figure 5:
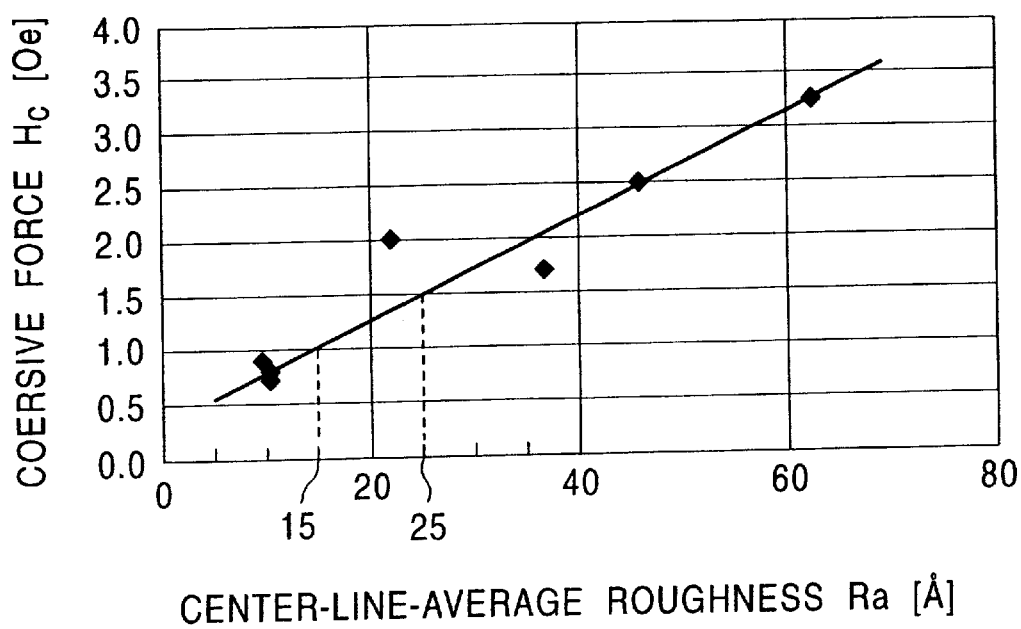
FIG. 5 is a graph showing the relationship between the coercive force $H_c$ and the center-line-average roughness ($R_a$) in a NiFe alloy film produced by an electroplating process using a pulsed direct current.

As shown in FIG. 5, the coercive force $H_c$ increases as the center-line-average roughness ($R_a$) increases. With reference to FIG. 5, the center-line-average roughness ($R_a$) was set to not more than 25 Å in order to maintain a coercive force $H_c$ of not more than 1.5 Oe, and more preferably not more than 15 Å in order to maintain a coercive force $H_c$ of not more than 1.0 Oe.

With reference to FIGS. 2 to 5, the NiFe alloy is formed by the electroplating process using an optimized pulsed direct current in the present invention so that the Fe content lies within a range of 60 percent by weight to 75 percent by weight and the average crystal grain size is not more than 105 Å. Preferably, the center-line-average roughness ($R_a$) is controlled to not more than 25 Å in order to achieve a saturation magnetic flux density $M_s$ exceeding 1.6 T and a coercive force $H_c$ not more than 1.5 Oe.

More preferably, the Fe content is at least 67 percent by weight to achieve a saturation magnetic flux density $M_s$ of at last 1.8 T. More preferably, the average crystal grain size is not more than 100 Å and the center-line-average roughness ($R_a$) is not more than 15 Å to achieve a coercive force $H_c$ of not more than 1.0 Oe.

What is claimed is:

1. A thin-film magnet head comprising:

a lower core layer comprising a magnetic material;

an upper core layer;

a magnetic gap provided between the lower core layer and the upper core layer, the lower core layer and the upper core layer opposing each other separated by the magnetic gap at a face opposing a magnetic medium; and a coil layer inducing a recording magnetic field in the lower core layer and the upper core layer;

wherein at least one of the lower core layer and the upper core layer comprises a soft magnetic film comprising a NiFe alloy having the formula $Ni_{1-x}Fe_x$, an average crystal grain size of not more than 105 Å, and an Fe content x in a range of 67 to 75 percent by weight.

2. A thin-film magnetic head according to claim 1, wherein the average crystal grain size is not more than 100 Å.

3. A thin-film magnetic head according to claim 1, wherein the saturation magnetic flux density of the lower core layer is lower thabn the saturation magnetic flux density of the upper core layer.

4. A thin-film magnetic head according to claim 1, wherein the soft magnetic film has a center-line-average roughness of not more than 25 Å.

5. A thin-film magnetic head according to claim 4, wherein the soft magnetic film has a center-line-average roughness of not more than 15 Å.

6. A thin-film magnetic head according to claim 1, wherein the soft magnetic film has a saturation magnetic flux density of at least 1.6 T.

7. A thin-film magnetic head according to claim 6, wherein the soft magnetic film has a saturation magnetic flux density of at least 1.8 T.

8. A thin-film magnetic head according to claim 1, wherein the soft magnetic film has a coercive force of not more than 1.5 Oe.

9. A thin-film magnetic head according to claim 8, wherein the soft magnetic film has a coercive force of not more than 1.0 Oe.

10. A thin-film magnetic head according to claim 1, wherein the soft magnetic film is formed by an electroplating process using a pulsed direct current.

* * * * *

UNITED STATES PATENT AND TRADEMARK OFFICE
CERTIFICATE OF CORRECTION

PATENT NO.   : 6,449,122 B1
DATED        : September 10, 2002
INVENTOR(S)  : Hisayuki Yazawa et al.

It is certified that error appears in the above-identified patent and that said Letters Patent is hereby corrected as shown below:

<u>Column 8,</u>
Line 3, delete "thabn" and substitute -- than -- in its place.

Signed and Sealed this

Eleventh Day of March, 2003

JAMES E. ROGAN
*Director of the United States Patent and Trademark Office*